(12) United States Patent
Zhou et al.

(10) Patent No.: US 12,425,224 B2
(45) Date of Patent: *Sep. 23, 2025

(54) DEVICE WITH SELF-AUTHENTICATION (71) Applicant: TAIWAN SEMICONDUCTOR MANUFACTURING CO., LTD., Hsinchu (TW)

(72) Inventors: Haohua Zhou, Fremont, CA (US); Sandeep Kumar Goel, Dublin, CA (US)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/476,019

(22) Filed: Sep. 27, 2023

(65) Prior Publication Data
US 2024/0022427 A1 Jan. 18, 2024

Related U.S. Application Data (63) Continuation of application No. 17/213,014, filed on Mar. 25, 2021, now Pat. No. 11,831,781, which is a
(Continued)

(51) Int. Cl.
*H04L 9/32* (2006.01)
*G06F 21/73* (2013.01)
*H04L 9/08* (2006.01)

(52) U.S. Cl.
CPC .......... *H04L 9/3239* (2013.01); *H04L 9/0869* (2013.01); *H04L 9/3278* (2013.01); *H04L 2209/805* (2013.01)

(58) Field of Classification Search
CPC .... H04L 9/3239; H04L 9/0869; H04L 9/3278
(Continued)

(56) References Cited

U.S. PATENT DOCUMENTS 7,813,507 B2 * 10/2010 Brickell ................ H04L 9/0662
713/181
8,667,580 B2 * 3/2014 Bhatt .................... G06F 21/575
713/192
(Continued)

FOREIGN PATENT DOCUMENTS

WO    2017216614 A1    12/2017

OTHER PUBLICATIONS

Wenlong Shen; Secure In-Band Bootstrapping for Wireless Personal Area Networks; IEEE: Year:2016;pp. 1385-1394.*
(Continued)

*Primary Examiner* — Monjur Rahim
(74) *Attorney, Agent, or Firm* — Maschoff Brennan (57) ABSTRACT

A device is disclosed. The device includes a first memory circuit and a processing circuit. The first memory circuit stores identifications of the device that are used to generate first hash data through a hash algorithm. The processing circuit is coupled to the first memory circuit and selects at least one bit of each of the identifications in sequence to form a bit sequence, generates second hash data through the hash algorithm based on the bit sequence and authenticates the device according to a comparison between the first hash data and the second hash data.

20 Claims, 4 Drawing Sheets

Related U.S. Application Data continuation of application No. 15/907,190, filed on Feb. 27, 2018, now Pat. No. 10,985,922.

(60) Provisional application No. 62/565,903, filed on Sep. 29, 2017.

(58) Field of Classification Search
USPC .......................................................... 713/189
See application file for complete search history.

(56) References Cited

U.S. PATENT DOCUMENTS

| | | | |
|---|---|---|---|
| 8,983,073 B1* | 3/2015 | Peterson | G06F 21/629 |
| | | | 713/193 |
| 8,984,296 B1* | 3/2015 | Young | G06F 21/57 |
| | | | 726/17 |
| 9,893,898 B2* | 2/2018 | Kreft | H04L 9/0643 |
| 10,599,796 B2 | 3/2020 | Zhou | |
| 2002/0147918 A1 | 10/2002 | Osthoff | |
| 2010/0023726 A1 | 1/2010 | Aviles | |
| 2010/0287604 A1* | 11/2010 | Potkonjak | G06F 21/73 |
| | | | 703/2 |
| 2011/0066835 A1 | 3/2011 | Kothari | |
| 2014/0165141 A1* | 6/2014 | Chellappa | G06F 21/44 |
| | | | 726/2 |
| 2015/0195088 A1* | 7/2015 | Rostami | H04L 9/3278 |
| | | | 380/28 |
| 2016/0149712 A1* | 5/2016 | Guo | H04L 63/0876 |
| | | | 713/168 |
| 2016/0359636 A1* | 12/2016 | Kreft | H04L 63/0428 |
| 2017/0337380 A1* | 11/2017 | Domke | H04L 9/3242 |
| 2018/0129801 A1* | 5/2018 | Cambou | H04L 9/0866 |
| 2018/0129802 A1* | 5/2018 | Cambou | H04L 9/0643 |
| 2018/0184290 A1* | 6/2018 | Luo | H04L 63/0442 |
| 2018/0241568 A1* | 8/2018 | Schilder | G06F 21/73 |
| 2018/0337790 A1* | 11/2018 | Brink | G09C 1/00 |
| 2019/0068592 A1* | 2/2019 | Mattela | H04L 63/0876 |
| 2019/0147967 A1* | 5/2019 | Tuyls | G11C 17/18 |
| | | | 365/96 |

OTHER PUBLICATIONS

Fatemeh Tehranipoor, DRAM bases Intrinsic Physical Unclonable Functions for System Level Security; ACM:2015; pp. 15-20.
Yang, Securing Time-synchronization Protocols in Sensor Networks: Attack Detection and Self-healing; IEEE:2008; p. 1-6.

* cited by examiner

DEVICE WITH SELF-AUTHENTICATION

RELATED APPLICATIONS

The present application is a continuation application of the U.S. application Ser. No. 17/213,014, filed Mar. 25, 2021, which is a continuation application of the U.S. application Ser. No. 15/907,190, filed Feb. 27, 2018, now U.S. Pat. No. 10,985,922, issued Apr. 20, 2021, which claims priority to U.S. Provisional Application No. 62/565,903, filed Sep. 29, 2017, all of which are herein incorporated by reference.

BACKGROUND

In Internet of things (IOT) application, authentication is important to ensure security during usage of an IOT device. Moreover, uniqueness of device identification (ID) is necessary in order to provide secure usage of the IOT device.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components, materials, values, steps, arrangements or the like are described below to simplify the present disclosure. These are, of course, merely examples and are not intended to be limiting. Other components, materials, values, steps, arrangements or the like are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. The term mask, photolithographic mask, photomask and reticle are used to refer to the same item.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

As used herein, the terms "comprising," "including," "having," "containing," "involving," and the like are to be understood to be open-ended, that is, to mean including but not limited to.

Figure 1:
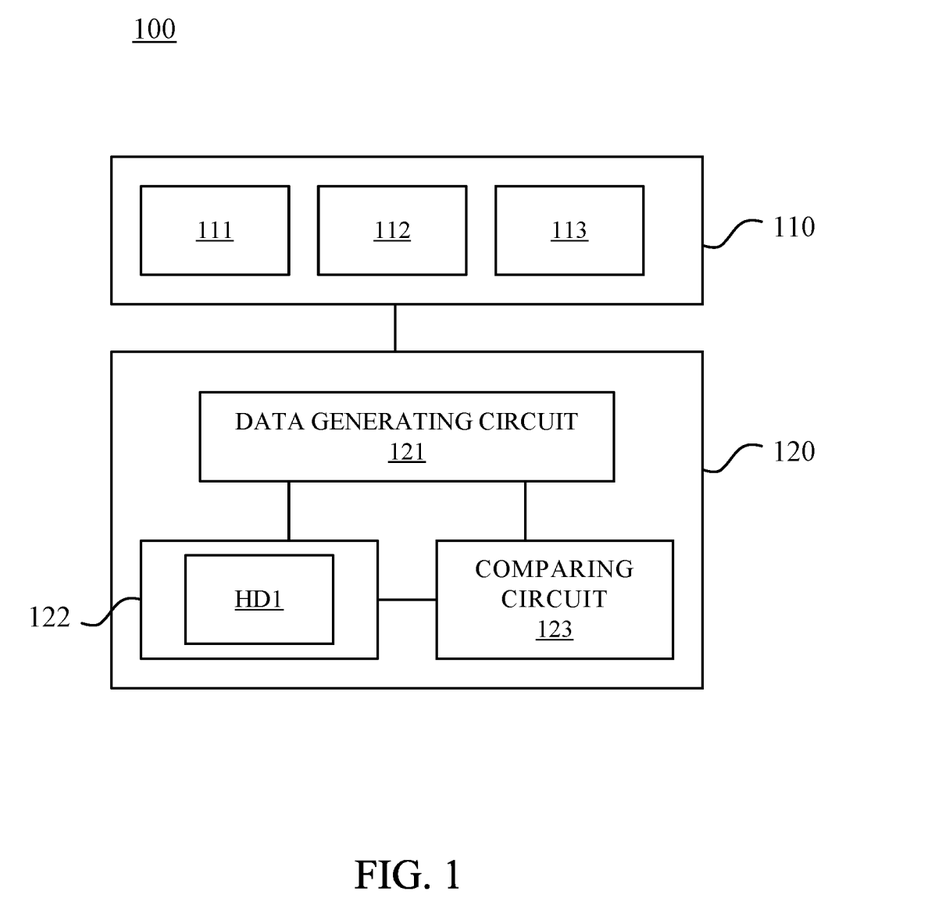
FIG. 1 is a schematic diagram of a device, in accordance with some embodiments of the present disclosure.

Reference is made to FIG. 1. FIG. 1 is a schematic diagram of a device 100, in accordance with some embodiments of the present disclosure. In some embodiments, the device 100 is implemented in an Internet of things (JOT) device which is able to communicate on a network. The IOT device includes, for example, an air-conditioner, a fan, a lamp, a set-top-box (STB), a media player, a television, a laptop, a speaker, and so on. The above implementation of the device 100 is given for illustrative purposes. Various implementations of the device 100 are within the contemplated scope of the present disclosure.

As illustratively shown in FIG. 1, the device 100 includes a memory circuit 110 and a processing circuit 120. The memory circuit 110 is coupled to the processing circuit 120. In some embodiments, the memory circuit 110 is configured to store a factory identification (ID) 111, a physical unclonable function (PUF) ID 112, and a program ID 113.

For illustration, the factory ID 111 includes, but not limited to, data indicating a serial number of a wafer.

The PUF ID 112 is a unique identifier obtained from a challenge-response mechanism employing variations, in manufacturing processes, of circuits, in some embodiments. For illustration, the relation between a challenge and a corresponding response is determined by statistical variations in logic components and interconnects in an integrated circuit. The PUF ID 112 in electronic circuits is used to distinguish integrated circuits (ICs) from one another. Using a PUF to distinguish one IC from another is a valuable way to authenticate ICs. The applications for such authentication include, for example, anti-counterfeiting, inventory control, multi-factor authentication, secret key generation for cryptographic and other security applications. An effective authentication mechanism can be executed in a number of ways, but typically involves the use of digital challenges (strings of 1's and 0's) which, when applied to a typical PUF circuit, generates corresponding digital responses (another string of 1's and 0's) that differ from one IC to the other. The PUFs include, for example, an analog PUF, a metal resistance PUF, an SRAM PUF and a circuit delay PUF which includes, for example, ring oscillator PUF. The types of PUF discussed above are given for illustrative purposes. Various types of PUF are within the contemplated scope of the present disclosure.

The program ID 113 is an identifier allocated to a program that indicates, for illustration, conditions and/or procedures of a process, and the program ID 113 is able to be programmed during manufacturing.

The IDs discussed above are given for illustrative purposes. Various types of IDs stored in the memory circuit 110 are within the contemplated scope of the present disclosure. For example, in various embodiments, the PUF ID 112 is replaced with an ID generated by a true random number generator (TRNG) (not shown). For illustration, the ID generated by the TRNG is also a unique identifier allowing the device to be distinguished from other devices. The true random number generator applied in the present disclosure is known and discussed in, for example, the U.S. application Ser. No. 15/724,671, filed Oct. 4, 2017, which claims the benefit of U.S. Provisional No. 62/491,541, filed Apr. 28, 2017, all of which are herein incorporated by reference in their entireties.

Figure 2:
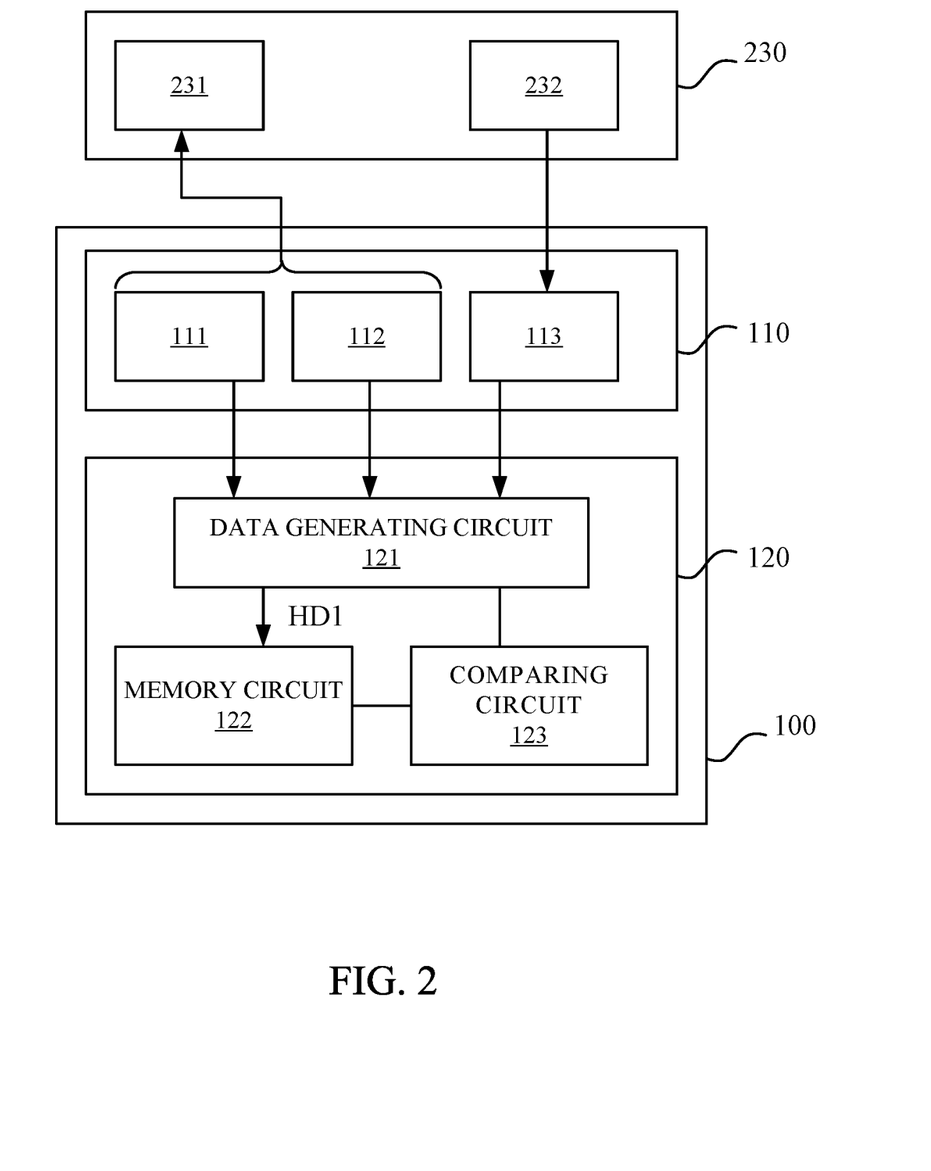
FIG. 2 is a schematic diagram of operations of the device in FIG. 1, in accordance with some embodiments of the present disclosure.

For illustration, the true random number generator, as discussed above, represents an electrical circuit that provides a sequence of random numbers. In some embodiments, the term "true random number" refers to the fact that the random number is generated taking account of physical noise of the circuitry environment, including physical noise of at least one of circuits/sub-circuits described in this document. Such circuits/sub-circuits include, for example, circuits 100, 110, 120, 230, etc., and corresponding sub-circuits 111, 112, 113, 121, 123, etc. During operation, one or more microscopic phenomena inside and/or outside of the true random number generator cause, for illustration, one or more low-level, statistically random entropy noise signals to be present within the true random number generator. The true random number generator utilizes the one or more low-level, statistically random entropy noise signals to provide the sequence of random numbers.

The one or more microscopic phenomena inside of the true random number generator include shot noise, flicker noise, burst noise, transit noise, and/or any other statistically random microscopic phenomenon existing inside of the true random number generator, in some embodiments. The one or more microscopic phenomena outside of the true random number generator include intermodulation noise, crosstalk, interference, atmospheric noise, industrial noise, extraterrestrial noise and/or any other statistically random microscopic phenomenon existing outside of the true random number generator, in some embodiments. The microscopic phenomena discussed above are given for illustrative purposes. Various microscopic phenomena are within the contemplated scope of the present disclosure.

The above implementation of the memory circuit 110 is given for illustrative purposes. Various implementations of the memory circuit 110 are within the contemplated scope of the present disclosure. In some embodiments, the memory circuit 110 includes, but not limited to, a static random access memory (SRAM).

In some embodiments, the processing circuit 120 includes a data generating circuit 121, a memory circuit 122 and a comparing circuit 123. The data generating circuit 121 is configured to generate, for illustration, hash data HD1, according to the factory ID 111, the PUF ID 112, the program ID 113, or the combination thereof. In some embodiments, the hash data HD1 include values that are derived by a hash function used to map data of arbitrary size to data of fixed size. In some embodiments, the data generating circuit 121 is also referred to as a hash engine.

The memory circuit 122 is configured to store the hash data HD1 generated by the data generating circuit 121. In some embodiments, the memory circuit 122 is a one-time programmable (OTP) memory circuit. The comparing circuit 123 is configured to compare the hash data HD1 from the memory circuit 122 and other hash data that are further generated by the data generating circuit 121.

The above configuration of the processing circuit 120 is given for illustrative purposes. Various configurations of the processing circuit 120 are within the contemplated scope of the present disclosure. For example, in various embodiments, the memory circuit 122 is configured outside the processing circuit 120 and is independent from the processing circuit 120. For another example, in various embodiments, the hash data HD1 are not generated by the data generating circuit 121, and, for illustration, the hash data HD1 are generated outside the device 100 and are pre-stored in the memory circuit 122.

Figure 3:
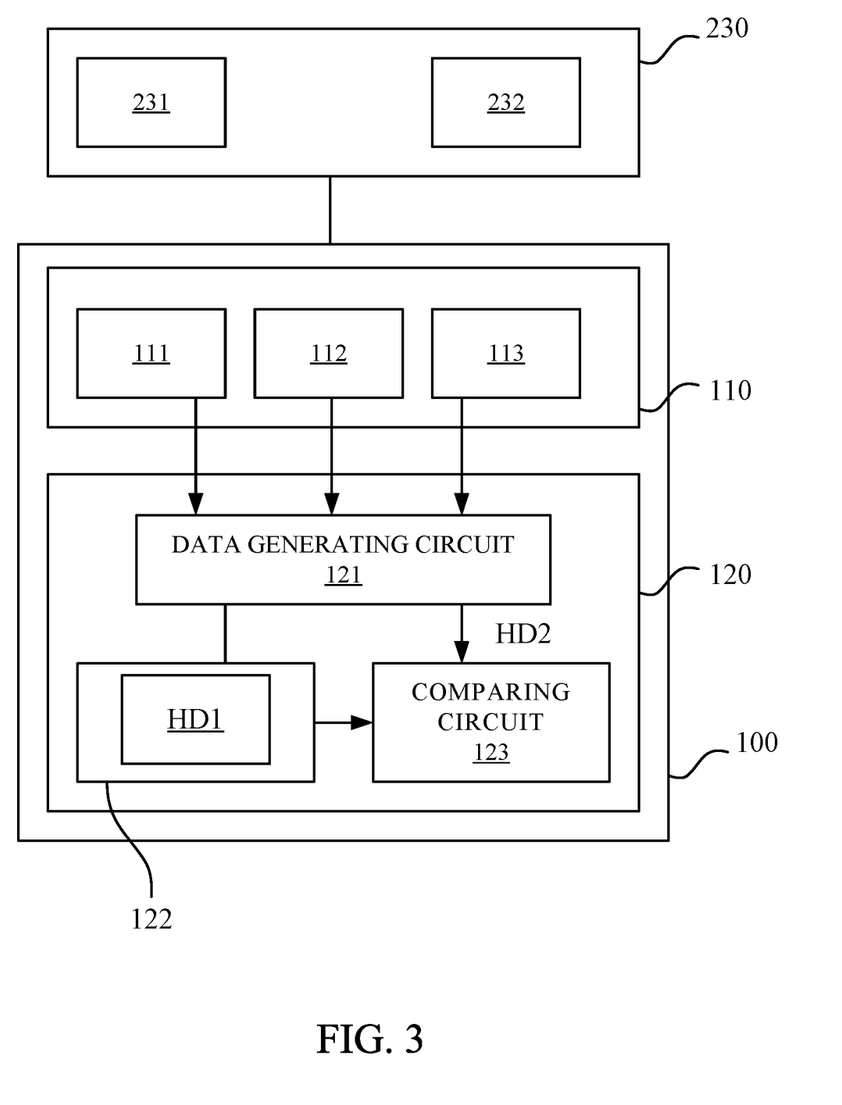
FIG. 3 is a schematic diagram of operations of the device in FIG. 1, in accordance with some embodiments of the present disclosure.
Figure 4:
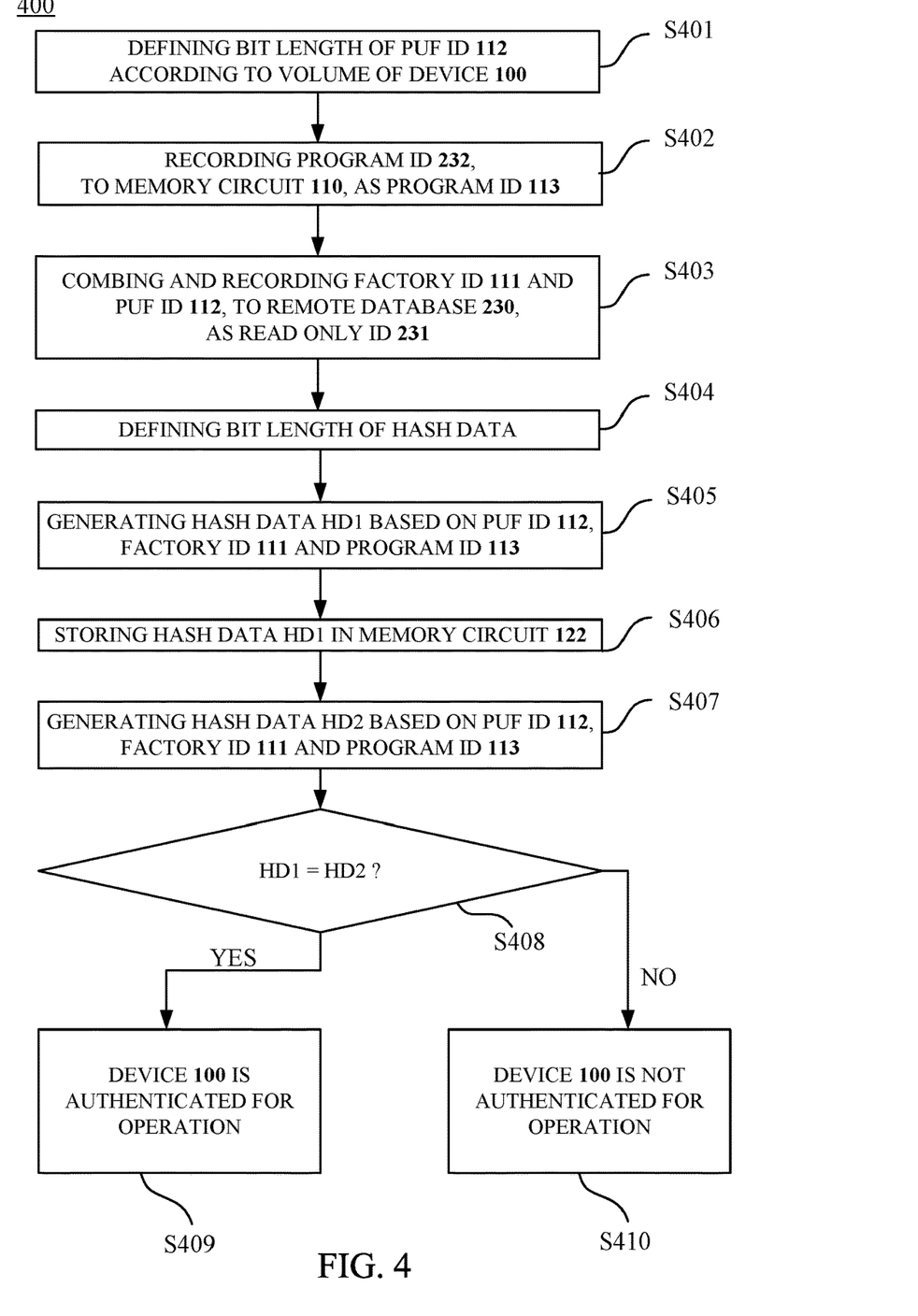
FIG. 4 is a flow chart illustrating a method by using the device in FIG. 1, in accordance with various embodiments of the present disclosure.

FIG. 2 and FIG. 3 are schematic diagrams of operations with respect to the device 100 in FIG. 1, in accordance with some embodiments of the present disclosure. With respect to the embodiments of FIG. 2 and FIG. 3, like elements in FIG. 1 are designated with the same reference numbers for ease of understanding. FIG. 4 is a flow chart illustrating a method 400 by using the device 100 in FIG. 1, in accordance with various embodiments of the present disclosure. The method 400 includes operations S401-S410. For ease of understanding, the method 400 in FIG. 4 is explained below with reference to FIG. 2 and FIG. 3.

In operation S401, for illustration of FIG. 1 and FIG. 4, a bit length of the PUF ID 112 is defined according to a volume of the device 100. In some embodiments, the bit length of the PUF ID 112 is also referred to as a size of the PUF ID 112. In some embodiments, defining the bit length of the PUF ID 112 is also referred to as calculating the bit length of the PUF ID 112. In some embodiments, the operation S401 is performed in a product design stage.

In some embodiments, the processing circuit 120 is configured to define the bit length of the PUF ID 112. In various embodiments, an additional circuit (not shown) is configured to define the bit length of the PUF ID 112.

For illustration, the bit length of the PUF ID 112 is defined according to a number (i.e., volume) of the device 100, where the number of the device 100 is denoted by K. For example, the data generating circuit 121 defines a minimum bit length PUF_length of the PUF ID 112 by formulas Eq. 1, Eq. 2, and Eq. 3 as follows.

$$PUF\_length > min\_length / H(p) \qquad \text{Eq. 1}$$

$$min\_length > (2 \log K - \log(2Cr)) \qquad \text{Eq. 2}$$

$$H(p) = -p \log_2 p - (1-p) \log_2 (1-p) \qquad \text{Eq. 3}$$

In the formulas Eqs. 1-3, H(p) is Shannon entropy, p is 0/1 probability, and Cr is a maximum limit of a collision rate of the IDs of the device 100. In some embodiments, the number K, the collision rate Cr and 0/1 probability p are associated with and/or determined by the volume of the device 100.

For example, by the formulas Eqs. 1-3, if the number K is one billion, the collision rate Cr is 0.2 per billion, and 0/1 probability p is 0.6, the data generating circuit 121 then defines 94 bits as the minimum bit length PUF_length. For another example, by the formulas Eqs. 1-3, if the number K is 100,000, the collision rate Cr is 0.2 per billion, and 0/1 probability p is 0.6, the data generating circuit 121 then defines 67 bits as the minimum bit length PUF_length. Based on the above, the bit length or size of the PUF ID 112 is able to be flexibly adjusted according to the volume of the device 100.

In some other approaches, a bit length or size of the PUF ID is fixed. Accordingly, too much data, more than necessary, corresponding to the PUF ID, is stored. As a result, the space of chip, for storing the data, are over designed and wasted.

Compared to the above approaches, the bit length or size of the PUF ID 112 in the present disclosure is able to be flexibly adjusted according to the volume of the device 100. With the flexibly adjusted PUF ID 112, overdesign of the memory circuit 110 including the PUF ID 112 is effectively avoided.

In various embodiments, the PUF ID 112 is replaced with an ID generated by a true random number generator (TRNG), as discussed above. Corresponding to the operation S401 discussed above, a minimum bit length TRNG_length of the ID generated by the TRNG is also able to be defined according to the volume (or the number K) of the device 100 in various embodiments. In some embodiments, the minimum bit length TRNG_length of the ID generated by the TRNG is also defined based on the algorithms as discussed above with respect to the PUF ID 112.

After operation S401, operations S402-S406 are performed. In some embodiments, the operations S402-S406 are performed in a manufacture stage.

In operation S402, with reference to FIG. 2, a program ID 232 previously stored in a remote database 230, is recorded or programmed, from the remote database 230 to the memory circuit 110, as the program ID 113 stored in the memory circuit 110.

In operation S403, with reference to FIG. 2, the factory ID 111 and the PUF ID 112 that are previously stored in the memory circuit 110, are combined and recorded, from the memory circuit 110 to the remote database 230, as a read only ID 231.

The above ID configurations in the memory circuit 110 and the remote database 230 are given for illustrative purposes. Various ID configurations in the memory circuit 110 and the remote database 230 are within the contemplated scope of the present disclosure.

In operation S404, with reference to FIG. 2, the processing circuit 120 defines a bit length of hash data to be generated, according to the volume of the device 100. In some embodiments, the bit length of hash data is also referred to as a size of the hash data. In some embodiments, defining the bit length of the hash data is also referred to as calculating the bit length of the hash data.

For illustration in FIG. 2, the data generating circuit 121 of the processing circuit 120 defines the bit length of the hash data HD1 to be generated, according to the number K of the device 100. For example, the data generating circuit 121 defines a minimum bit length hash_length of the hash data HD1 by a formula Eq. 4 as follows.

$$\text{hash\_length} > (2 \log K - \log(2Cr)) \quad \text{Eq. 4}$$

In the formula Eq. 4, Cr is a maximum limit of a collision rate of hash data.

For example, by the formula Eq. 4, if the number K is one billion, and the collision rate Cr is 0.2 per billion, the data generating circuit 121 then defines 91 bits as the minimum bit length hash_length. For another example, by the formula Eq. 4, if the number K is 100,000, and the collision rate Cr is 0.2 per billion, the data generating circuit 121 then defines 65 bits as the minimum bit length hash_length.

In operation S405, for illustration in FIG. 2 and FIG. 4, the data generating circuit 121 generates the hash data HD1 based on the factory ID 111, the PUF ID 112 and the program ID 113. In some embodiments, the data generating circuit 121 selects a hash algorithm for processing ID data corresponding to the factory ID 111, the PUF ID 112 and the program ID 113 stored in the memory circuit 110, in order to generate the hash data HD1. The hash algorithm is selected based on secure requirement. For example, the hash algorithm includes, but not limited to, cryptographic hash function and cyclic redundancy check (CRC) hash function. The cryptographic hash function includes, for example, a message digest algorithm (e.g., MD5), a security hash algorithm (e.g., SHA-1, SHA-2, and SHA-3), or the like. The cyclic redundancy check hash function includes, for example, CRC-16, CRC-32, or the like. The data generating circuit 121 processes the ID data by employing the selected hash algorithm to generate the hash data HD1.

In some embodiments, the processing circuit 120 selects at least one bit of the factory ID 111, at least one bit of the PUF ID 112, and at least one bit of the program ID 113, and combines the at least one bit of the factory ID 111, the at least one bit of the PUF ID 112, and the at least one bit of the program ID for forming the hash data HD1.

In some embodiments, the data generating circuit 121 selects T bits of the ID data corresponding to the factory ID 111, the PUF ID 112 and the program ID 113, in order for generating the hash data HD1. For illustration in FIG. 2, the data generating circuit 121 selects T bits from the factory ID 111, the PUF ID 112 and the program ID 113 to form the ID data. In some embodiments, the selected T bits indicate a bit length of the ID data. The bit length indicated by the T bits is greater than the bit length of the hash data HD1 generated by the data generating circuit 121.

In some embodiments, the data generating circuit 121 selects T1 bits from the factory ID 111, T2 bits from the PUF ID 112, and T3 bits from the program ID 113. Each one of T1, T2 and T3 is larger than 1, and a sum of T1, T2 and T3 equals to T. For illustration, the selected T1 bits are included in data F[T1:1], the selected T2 bits are included in data U[T2:1], and the selected T3 bits are included in data P[T3:1]. The data generating circuit 121 then combines the data F[T1:1], the data U[T2:1] and the data P[T3:1] in sequence to form the ID data (F[T1:1], U[T2:1], P[T3:1]). The above combination of the data F[T1:1], the data U[T2:1] and the data P[T3:1] are given for illustrative purposes. Various combinations of the data F[T1:1], the data U[T2:1] and the data P[T3:1] are within the contemplated scope of the present disclosure. For example, for another illustration, the data generating circuit 121 combines the data U[T2:1], the data P[T3:1] and the data F[T1:1] in sequence to form the ID data (U[T2:1], P[T3:1], F[T1:1]).

As discussed above, the data generating circuit 121 selects a hash algorithm for processing the ID data, in order to generate the hash data HD1. Accordingly, for illustration, the data generating circuit 121 processes the ID data (F[T1:1], U[T2:1], P[T3:1]) via the selected message digest algorithm MD5 to generate the hash data HD1. For another illustration, the data generating circuit 121 processes the ID data (U[T2:1], P[T3:1], F[T1:1]) via the selected security hash algorithm SHA-1 to generate the hash data HD1.

The combination of bits of the factory ID 111, the PUF ID 112, and the program ID, for forming the hash data HD1, as discussed above, is given for illustrative purposes. Various ways of combing or mixing bits to form the hash data HD1 are within the contemplated scope of the present disclosure. For example, in various embodiments, bits of the factory ID 111, the PUF ID 112, and the program ID are concatenated to form various permutations of the hash data HD1. Various permutations of bits of the factory ID 111, the PUF ID 112, and the program ID are within the contemplated scope of the present disclosure.

In operation S406, the memory circuit 122 receives and stores the hash data HD1 generated by the data generating circuit 121, as illustratively shown in FIG. 2. In some embodiments, the memory circuit 122 is implemented by an electrical fuse (eFuse) memory circuit (not shown). The hash data HD1 are programmed into the eFuse memory circuit, and afterwards, the hash data HD1 are unchangeable.

In various embodiments, the processing circuit 120 further includes an OTP programming circuit (not shown) coupled to program the memory circuit 122. For illustration, after the OTP programming circuit writes (or programs) the hash data HD1 generated in operation S405 into the memory circuit 122, the processing circuit 120 disables the OTP programming circuit. Accordingly, the hash data HD1 stored in the memory circuit 122 are not able to be changed anymore. As a result, security performance of the device 100 is effectively improved.

In some embodiments, the hash data HD1 is generated outside the processing circuit 120 and pre-stored or programmed in the memory circuit 122.

After operation S406, operations S407-S410 are performed. In some embodiments, the operations S407-S410 are performed in a deployed stage, with reference to FIG. 3.

To identify whether the device 100 is tampered or altered, an authentication or verification is performed. In some embodiments, data in the device 100 will be compared with pre-configured data. When the comparison result is a mismatch, the device 100 is determined to have been tampered or hacked.

In some embodiments, the authentication is performed, off line, by the device 100 itself. In some other embodiments, this authentication is performed, on line, by the device 100 communicating with the remote database 230.

For illustration of the authentication performed by the device 100 itself, in operation S407, with reference to FIG. 3 and FIG. 4, the data generating circuit 121 generates hash data HD2 based on the factory ID 111, the PUF ID 112 and the program ID 113, for the authentication.

In some embodiments, during usage of the device 100, in response to a power-on event or a request, the processing circuit 120 generates the hash data HD2 based on the factory ID 111, the PUF ID 112 and the program ID 113. For illustration, when the device 100 is powered on, the processing circuit 120 generates the hash data HD2 based on the factory ID 111, the PUF ID 112 and the program ID 113. For another illustration, when the device 100 receives a request, the processing circuit 120 generates the hash data HD2 based on the factory ID 111, the PUF ID 112 and the program ID 113. Various conditions of generating the hash data HD2 are within the contemplated scope of the present disclosure.

Similar to operation S405, in some embodiments, the data generating circuit 121 selects at least one bit of the PUF ID 112, at least one bit of the factory ID 111, and at least one bit of the program ID 113, and combines the selected bits of the factory ID 111, the PUF ID 112 and the program ID 113 to form the hash data HD2.

As discussed above with respect to generating the hash data HD1, the data generating circuit 121 also selects T bits of ID data corresponding to the factory ID 111, the PUF ID 112 and the program ID 113, in order for generating the hash data HD2. The bit length of the ID data for generating the hash data HD2 is the same as the aforementioned bit length of the ID data for generating the hash data HD1. Correspondingly, the bit length of the ID data for generating the hash data HD2 is also greater than the bit length of the hash data HD2.

To generate the hash data HD2, the data generating circuit 121 also selects T1 bits from the factory ID 111, T2 bits from the PUF ID 112 and T3 bits from the program ID 113, and a sum of T1, T2 and T3 equals to T. The data generating circuit 121 then combines the data F[T1:1], the data U[T2:1] and the data P[T3:1] to form corresponding ID data. As discussed above, various combinations of the data F[T1:1], the data U[T2:1] and the data P[T3:1] are within the contemplated scope of the present disclosure. Afterwards, the data generating circuit 121 selects a hash algorithm for processing the corresponding ID data, in order to generate the hash data HD2.

For illustration, if the data generating circuit 121 processes the ID data (F[T1:1], U[T2:1], P[T3:1]) via the selected message digest algorithm to generate the hash data HD1 in operation S405, the data generating circuit 121 then processes the corresponding ID data via the selected message digest algorithm to generate the hash data HD2 in operation S407. For another illustration, if the data generating circuit 121 processes the ID data (U[T2:1], P[T3:1], F[T1:1]) via the selected security hash algorithm SHA-1 to generate the hash data HD1 in operation S403, the data generating circuit 121 then processes the corresponding ID data via the selected security hash algorithm SHA-1 to generate the hash data HD2 in operation S407.

In operation S408, the processing circuit 120 compares the hash data HD1 and the hash data HD2 to perform an off-line authentication, in order to identify whether the device 100 is tampered or altered. In some embodiments, the off-line authentication indicates that the device 100 is able to perform the authentication on itself, without being connected to or accessing a database and/or a network/cloud. For illustration, the comparing circuit 123 of the processing circuit 120 compares the hash data HD1 stored in the OTP memory circuit 122 and the hash data HD2 generated by the data generating circuit 121, to determine whether the hash data HD2 matches the hash data HD1. If the comparing circuit 123 determines that the hash data HD2 matches the hash data HD1, the processing circuit 120 determines that the off-line authentication is successful. The successful off-line authentication indicates that the device 100 is not tampered and is secure for usage. Accordingly, when the comparing circuit 123 determines that the hash data HD2 matches the hash data HD1, the device 100 is authenticated, in operation S409. As a result, the device 100 is qualified for usage and operation.

On the contrary, if the comparing circuit 123 determines that the hash data HD2 does not match the hash data HD1, the processing circuit 120 determines that the off-line authentication is unsuccessful. The unsuccessful off-line authentication indicates that the device 100 has been tampered and is not secure enough for usage. Accordingly, when the comparing circuit 123 determines that the hash data HD2 does not match the hash data HD1, the device 100 is not authenticated, in operation S410. As a result, the device 100 is not qualified for usage and operation.

Based on the above, when the device 100 is powered on or receives a request, the processing circuit 120 is able to perform the off-line authentication internally without being connected to, for example, the remote database 230. Therefore, usage of the device 100 is more secure and convenient.

In various embodiments, the processing circuit 120 is also able to perform an online authentication. As discussed above, for illustration in FIG. 3, the remote database 230 stores the read only ID 231 (including the original factory ID 111 and the original PUF ID 112) and the program ID 232. To perform the online authentication, the processing circuit 120 compares the factory ID 111, the PUF ID 112 and the program ID 113 stored in the memory circuit 110 with the read only ID 231 (including the original factory ID and the original PUF ID) and the program ID 232 stored in the remote database 230. If the comparing circuit 123 determines that the factory ID 111, the PUF ID 112 and the program ID 113 matches the read only ID 231 and the program ID 232, the processing circuit 120 then determines that the online authentication is successful. Accordingly, the device 100 is authenticated, as illustrated in operation S409. As a result, the device 100 is qualified for usage and operation.

On the contrary, if the comparing circuit 123 determines that the factory ID 111, the PUF ID 112 and the program ID 113 do not match the read only ID 231 and the program ID 232, the processing circuit 120 then determines that the online authentication is unsuccessful. Accordingly, the device 100 is not authenticated, as illustrated in operation S410. As a result, the device 100 qualified for usage and operation.

In some other approaches, the size of the PUF ID is fixed and unchangeable. Accordingly, too much data corresponding to the PUF ID is stored. As a result, the space of device, for storing the data, are over designed and wasted. Moreover, the IDs of the device are only able to be checked when the device is connected to a remote database (e.g., a cloud database), which results in inconvenience during the usage of the device.

Compared to the aforementioned approaches, the processing circuit 120 defines the minimum bit length PUF_length (bits) of the PUF ID 112 according to the volume of the device 100. Accordingly, the PUF ID 112 is able to be adjusted. As a result, the area of the memory circuit 110 that stores the PUF ID 112 is effectively saved.

In addition, in order to check whether the device 100 is tampered during usage, the processing circuit 120 is able to perform the off-line authentication and/or the online authentication. Accordingly, security of the device 100 is able to be checked with and/or without being connected to, for illustration, the remote database 230. Alternatively stated, without connection to the remote database 230, it is still able to check whether the device 100 is tampered, by comparing the hash data HD2 generated in response to the power-on event or the request, with the unchangeable hash data HD1 stored in the OTP memory circuit 122. Therefore, any change in the factory ID 111, the PUF ID 112 and/or the program ID 113 is internally checked by the device 100 itself. As a result, security performance of the device 100 is effectively improved.

The operations discussed above are given for illustrative purposes. Additional operations are within the contemplated scoped of the present disclosure. For example, in various embodiments, additional operations are provided before, during, and/or after the operations in the method 400 illustrated in FIG. 4, and/or some of the operations described are replaced or eliminated for various embodiments of the method 400.

In some embodiments, a device is disclosed that includes a first memory circuit and a processing circuit. The first memory circuit is configured to store first hash data. The processing circuit is coupled to the first memory circuit. The processing circuit is configured to: at least based on a volume of the device, define a size of a distinguishable identification (ID) and a size of second hash data; based on a combination of at least one bit of each of the distinguishable ID and IDs of the device, generate the second hash data; and compare the first hash data with the second hash data, in order to identify whether the device is tampered.

In some embodiments, the size of the distinguishable ID is defined further based on a collision rate of the IDs and 0/1 probability. The size of the second hash data is defined further based on the collision rate of the IDs.

In some embodiments, the processing circuit is further configured to: based on the volume of the device and a collision rate of the IDs, define a size of the first hash data. The size of the first hash data is equal to the size of the second hash data.

In some embodiments, the processing circuit is further configured to: select a hash algorithm; and based on the selected hash algorithm, process the distinguishable ID and the IDs, to generate the first hash data.

In some embodiments, the processing circuit is further configured to: select the at least one bit of each of the distinguishable ID, a factory ID and a program ID of the IDs; and combine the selected at least one bit of each of the distinguishable ID, the factory ID and the program ID of the IDs.

In some embodiments, the device further includes a second memory circuit. The second memory circuit is coupled to the processing circuit, and is configured to store the distinguishable ID and the IDs comprising a factory ID and a program ID.

In some embodiments, the distinguishable ID comprises a physical unclonable function (PUF) ID or a true random number generator (TRNG) ID.

Also disclosed is a method that includes the operations: calculating a bit length of a distinguishable identification (ID) based on at least one parameter that is associated with a volume of a device; combing at least one bit of each of the distinguishable ID, a factory ID and a program ID of the device, to generate first hash data having a bit length that is defined based on the volume of the device; and initiating authentication of the device, when the first hash data is matched with second hash data.

In some embodiments, the at least one parameter includes a collision rate of IDs and 0/1 probability.

In some embodiments, the method further includes the operation: calculating the bit length of the first hash data based on the volume of the device and a collision rate of IDs. The bit length of the first hash data is the same as a bit length of the second hash data.

In some embodiments, the method further includes the operation: comparing the first hash data with the second hash data, to perform an off-line authentication.

In some embodiments, the method further includes the operation: selecting at least one bit of the distinguishable ID, at least one bit of the factory ID and at least one bit of the program ID, to be combined to form ID data; and generating the second hash data based on the ID data.

In some embodiments, the operation of generating the second hash data includes the operation: selecting a hash algorithm based on a secure requirement; and processing the ID data via the selected hash algorithm.

In some embodiments, the method further includes the operation: generating the second hash data based on the distinguishable ID, the factory ID and the program ID, in response to a power-on event or a request.

Also disclosed is a method that includes the operations: receiving first hash data that has a defined size associated with a volume of a device; combining at least one bit of each of a distinguishable identification (ID), a factory ID and a program ID of the device, to form ID data; processing the ID data through a selected hash algorithm, to generate second hash data; and comparing the first hash data with the second hash data, to perform an authentication of the device.

In some embodiments, the method further includes the operation: defining a size of the distinguishable ID based on the volume of the device, a collision rate of IDs and 0/1 probability. The defined size of the first hash data is further associated with the collision rate of IDs.

In some embodiments, the method further includes the operations: selecting a first number of bits from the distinguishable ID, to be combined to form the ID data; selecting a second number of bits from the factory ID, to be combined to form the ID data; and selecting a third number of bits from the program ID, to be combined to form the ID data.

In some embodiments, each of the first number, the second number and the third number is greater than one. At least one of the first number, the second number and the third number is different from the others.

In some embodiments, the method further includes the operation: defining a size of the second hash data based on the volume of the device and a collision rate of IDs. The size of the second hash data is the same as the defined size of the first hash data.

In some embodiments, the method further includes the operation: when the first hash data and the second hash data are mismatched, determining that the device has been tampered.

A device is disclosed. The device includes a first memory circuit and a processing circuit. The first memory circuit stores identifications of the device that are used to generate first hash data through a hash algorithm. The processing circuit is coupled to the first memory circuit and selects at least one bit of each of the identifications in sequence to form a bit sequence, generates second hash data through the hash algorithm based on the bit sequence and authenticates the device according to a comparison between the first hash data and the second hash data.

In some embodiments, the identifications comprise a distinguishable ID, a factory ID and a program ID.

In some embodiments, the distinguishable ID comprises a physical unclonable function (PUF) ID or a true random number generator (TRNG) ID.

In some embodiments, the device further comprises a second memory circuit coupled to the processing circuit and configured to store the first hash data. The first hash data is generated outside the device and pre-stored in the second memory circuit.

In some embodiments, the processing circuit further defines a size of a distinguishable identification (ID) of the identifications based on a volume of the device, collision rate of the IDs and 0/1 probability and defines a size of the second hash data based on the volume of the device and the collision rate of the IDs.

In some embodiments, the processing circuit further, based on the volume of the device and a collision rate of the IDs, defines a size of the first hash data. The size of the first hash data is equal to the size of the second hash data.

In some embodiments, the processing circuit further compares the IDs with a read only ID and a program ID from a remote database.

A method is also disclosed. The method comprises: generating a first hash data through a hash algorithm and storing the first hash data in a first memory circuit of a device; receiving a distinguishable identification (ID), a factory ID and a program ID from a second memory circuit, wherein a bit length of the distinguishable ID is defined based on a volume of the device; selecting at least one bit from each of the distinguishable ID, the factory ID and the program ID to form a bit sequence; generating second hash data through the hash algorithm based on the bit sequence; and comparing the first hash data with the second hash data to initiating authentication of the device.

In some embodiments, the method further comprises: calculating the bit length of the distinguishable ID based on at least one parameter that is associated with the volume of a device, wherein the at least one parameter comprises a collision rate of IDs and 0/1 probability.

In some embodiments, the method further comprises: calculating a bit length of the first hash data based on the volume of the device and a collision rate of IDs, wherein the bit length of the first hash data is the same as a bit length of the second hash data.

In some embodiments, the method further comprises: comparing the first hash data with the second hash data, to perform an off-line authentication.

In some embodiments, the method further comprises: comparing the distinguishable ID, the factory ID and the program ID with IDs from a remote database to perform an online authentication.

In some embodiments, the generating the second hash data further comprises: generating the second hash data in response to a power-on event or a request.

A method is also disclosed. The method comprises: processing identification (ID) data through a hash algorithm to generate first hash data in a device, wherein a first length of the ID data is greater than a second length of the first hash data; combining at least one bit of each of a distinguishable ID, a factory ID and a program ID of a memory circuit in the device to form a bit sequence having the first length; processing the bit sequence through the hash algorithm to generate second hash data; and identifying, by determining that the first hash data matches the second hash data, that the device is altered and not authenticated for operation.

In some embodiments, the method further comprises: combining IDs that are used to generate the ID data, in order form a read only ID stored in a remote database; and identifying, by determining that the distinguishable ID and the factory ID match the read only ID, that the device is altered and not authenticated for operation.

In some embodiments, the method further comprises: defining a size of the distinguishable ID based on a volume of the device, a collision rate of IDs and 0/1 probability.

In some embodiments, the method further comprises: defining the second length based on a volume of the device and a collision rate of IDs.

In some embodiments, the method further comprises: selecting first to third numbers of bits from the distinguishable ID, the factory ID and the program ID respectively to form the bit sequence, wherein at least one of the first to third numbers is different from the others.

In some embodiments, the method further comprises: when the first hash data and the second hash data are mismatched, determining that the device has been hacked.

In some embodiments, the combining at least one bit of each of the distinguishable ID, the factory ID and the program ID to form the bit sequence is in response to a power-on event or a request.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A device, comprising:
   a true random number generator configured to generate a true random number generator (TRNG) ID according to a physical noise of the device;
   a first memory circuit configured to store a plurality of identifications of the device that are used to generate first hash data through a hash algorithm, wherein the plurality of identifications comprises the TRNG ID;
   a processing circuit coupled to the first memory circuit and configured to:
     select at least one bit of each of the plurality of identifications, written to the first memory circuit, in sequence to form a bit sequence;
     generate second hash data through the hash algorithm based on the bit sequence; and
     authenticate the first memory circuit according to a comparison between the first hash data and the second hash data.

2. The device of claim 1, wherein the plurality of identifications comprise a distinguishable ID, a factory ID and a program ID.

3. The device of claim 2, wherein the distinguishable ID comprises a physical unclonable function (PUF) ID.

4. The device of claim 1, further comprising:
   a second memory circuit coupled to the processing circuit and configured to store the first hash data, wherein the first hash data is generated outside the device and pre-stored in the second memory circuit.

5. The device of claim 1, wherein the processing circuit is further configured to:
   define a size of a distinguishable identification (ID) of the plurality of identifications based on a volume of the device, collision rate of the IDs and 0/1 probability; and
   define a size of the second hash data based on the volume of the device and the collision rate of the IDs.

6. The device of claim 1, wherein the processing circuit is further configured to:
   define a size of the first hash data based on a volume of the device and a collision rate of the IDs,
   wherein the size of the first hash data is equal to the size of the second hash data.

7. The device of claim 1, wherein the processing circuit is further configured to compare the plurality of IDs with a read only ID and a program ID from a remote database.

8. A method, comprising:
   generating a first hash data through a hash algorithm and storing the first hash data in a first memory circuit of a device;
   receiving a distinguishable identification (ID), a factory ID and a program ID from a second memory circuit, wherein a bit length of the distinguishable ID is defined based on a volume of the device and an entropy corresponding to a bit of the device;
   selecting at least one bit from each of the distinguishable ID, the factory ID and the program ID to form a bit sequence;
   generating second hash data through the hash algorithm based on the bit sequence; and
   comparing the first hash data with the second hash data to initiating authentication of the device.

9. The method of claim 8, further comprising:
   calculating the bit length of the distinguishable ID based on at least one parameter that is associated with the volume of a device, wherein the at least one parameter comprises a collision rate of IDs and 0/1 probability.

10. The method of claim 8, further comprising:
    calculating a bit length of the first hash data based on the volume of the device and a collision rate of IDs,
    wherein the bit length of the first hash data is the same as a bit length of the second hash data.

11. The method of claim 8, further comprising:
    comparing the first hash data with the second hash data to perform an off-line authentication.

12. The method of claim 8, further comprising:
    comparing the distinguishable ID, the factory ID and the program ID with IDs from a remote database to perform an online authentication.

13. The method of claim 8, wherein the generating the second hash data comprises:
    generating the second hash data in response to a power-on event or a request.

14. A method, comprising:
    processing identification (ID) data through a hash algorithm to generate first hash data in a device, wherein a first length of the ID data is greater than a second length of the first hash data;
    combining at least one bit of each of a distinguishable ID, a factory ID and a program ID that are stored in a memory circuit in the device to form a bit sequence having the first length, wherein the distinguishable ID is generated according to a physical noise of the device;
    processing the bit sequence through the hash algorithm to generate second hash data; and
    identifying, by determining that the first hash data matches the second hash data, that the device is altered and not authenticated for operation.

15. The method of claim 14, further comprising:
    combining IDs that are used to generate the ID data, in order to form a read only ID stored in a remote database; and
    identifying, by determining that the distinguishable ID and the factory ID match the read only ID, that the device is altered and not authenticated for operation.

16. The method of claim 14, further comprising:
    defining a size of the distinguishable ID based on a volume of the device, a collision rate of IDs, and 0/1 probability.

17. The method of claim 14, further comprising:
    defining the second length based on a volume of the device and a collision rate of IDs.

18. The method of claim 14, further comprising:
    selecting first to third numbers of bits from the distinguishable ID, the factory ID and the program ID respectively to form the bit sequence,
    wherein at least one of the first to third numbers is different from the others.

19. The method of claim 14, further comprising:
    when the first hash data and the second hash data are mismatched, determining that the device has been hacked.

20. The method of claim 14, wherein the combining at least one bit of each of the distinguishable ID, the factory ID and the program ID to form the bit sequence is in response to a power-on event or a request.

* * * * *